United States Patent [19]

Müller et al.

[11] Patent Number: 5,111,916

[45] Date of Patent: May 12, 1992

[54] APPARATUS FOR ENGAGING AND DISENGAGING A PERMANENT-MAGNET SLIPPER BRAKE

[75] Inventors: Walter Müller, Bassersdorf; Max Koller, Schleinikon, both of Switzerland

[73] Assignee: Oerlikon-Knorr Eisenbahntechnik AG, Zurich, Switzerland

[21] Appl. No.: 549,755

[22] Filed: Jul. 9, 1990

[30] Foreign Application Priority Data

Jul. 21, 1989 [CH] Switzerland ............... 02745/89

[51] Int. Cl.⁵ .................... B60L 7/00; B60T 13/00
[52] U.S. Cl. .................... 188/165; 188/153 R; 303/7; 303/15
[58] Field of Search .......... 188/165, 164, 151 R, 188/153 R; 303/2, 5, 7, 15

[56] References Cited

U.S. PATENT DOCUMENTS

| | | | |
|---|---|---|---|
| 3,053,349 | 9/1962 | Huntress et al. | 188/153 R |
| 3,493,086 | 2/1970 | Braun | 188/165 |
| 3,584,709 | 6/1971 | Conway | 188/152 |
| 3,976,333 | 8/1976 | Fillion et al. | 303/2 |
| 4,201,277 | 6/1980 | Meier et al. | 188/153 R X |
| 4,307,916 | 12/1981 | Straut et al. | 303/15 X |
| 4,484,666 | 11/1984 | Steinmetz et al. | 188/165 |
| 4,867,279 | 9/1989 | Link et al. | 188/62 |

FOREIGN PATENT DOCUMENTS

| | | |
|---|---|---|
| 3446496 | 7/1986 | Fed. Rep. of Germany |
| 2249476 | 5/1975 | France |
| 721748 | 1/1955 | United Kingdom |
| 2053392 | 2/1981 | United Kingdom |

OTHER PUBLICATIONS

Verkehr und Technik, No. 6, Jun. 1988, pp. 265/6 "Die Permanent-Magnetschienenbremse".

*Primary Examiner*—Robert J. Oberleitner
*Assistant Examiner*—Josie A. Ballato
*Attorney, Agent, or Firm*—Sandler, Greenblum & Bernstein

[57] ABSTRACT

For engaging and disengaging a permanent-magnet slipper brake for a rail vehicle there are required relatively high forces which are generated either by a hydraulic motor or an electric motor. Therefore, in rail vehicles without external electric or external hydraulic connections and comprising a pneumatic brake line or brake-pressure lead, there is incorporated a pneumatically driven hydraulic power pump by means of which a hydraulic motor can be driven. This hydraulic motor is then capable of applying the forces required for engaging and disengaging the permanent-magnet slipper brake. The engaging and disengaging process is preferably controlled by a main air line.

4 Claims, 1 Drawing Sheet

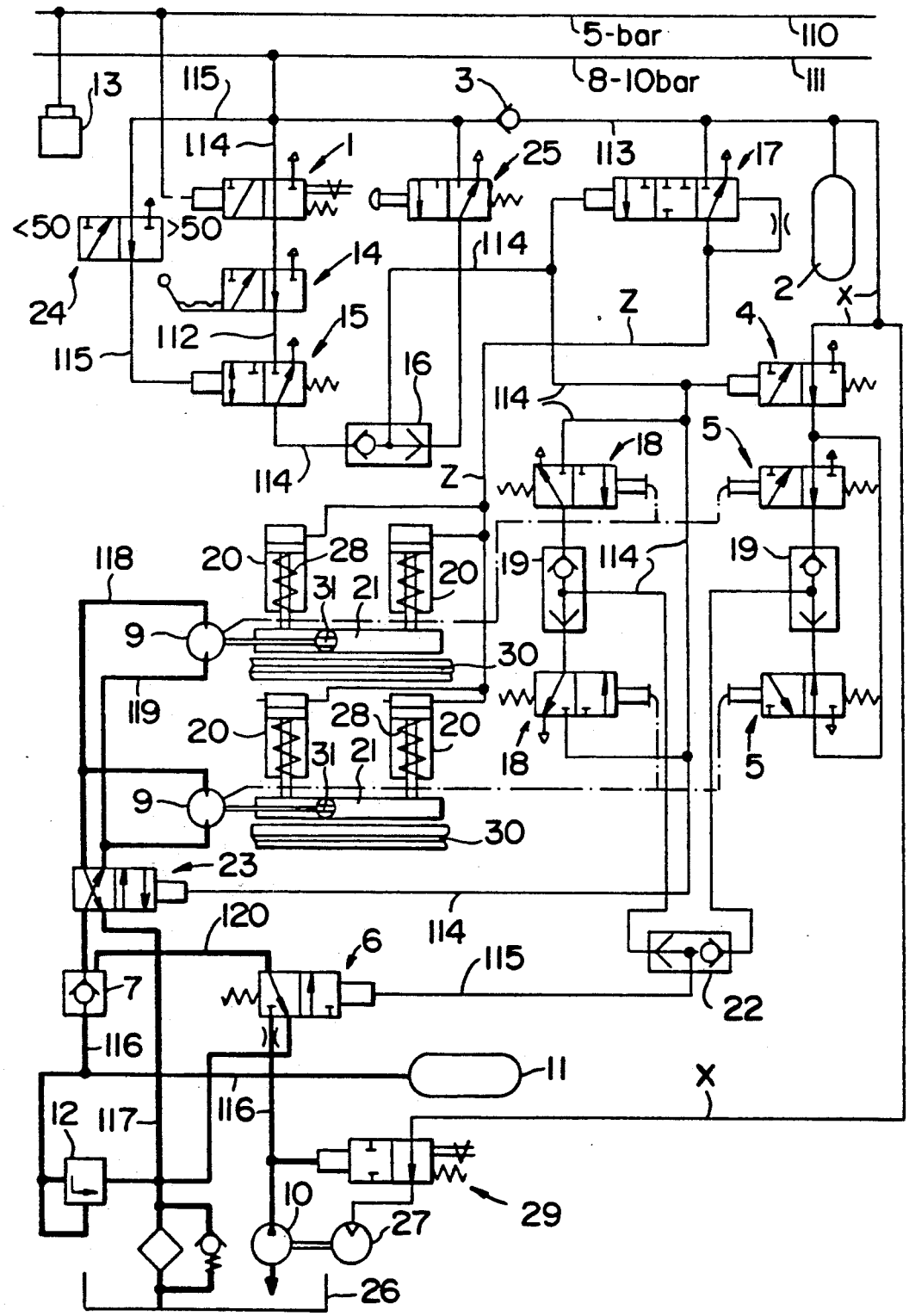

APPARATUS FOR ENGAGING AND DISENGAGING A PERMANENT-MAGNET SLIPPER BRAKE

BACKGROUND OF THE INVENTION

The present invention broadly relates to friction rail track brakes and pertains, more specifically, to a new and improved apparatus for engaging or activating and disengaging or deactivating a permanent-magnet slipper brake.

Generally speaking, the apparatus for engaging and disengaging a permanent-magnet slipper brake of the present development is of the type provided for a rail vehicle equipped with a pneumatic main line and a pneumatic feed line or conduit.

For engaging and disengaging a permanent-magnet slipper brake there are required relatively high forces which are generated or produced either by an electric motor or by a hydraulic motor.

On the one hand, for the braking operation, such a permanent-magnet slipper brake has to be lowered to the rails or rail tracks on which the vehicle is traveling. An example of such a magnetic device is shown in Braun, U.S. Pat. No. 3,493,086. This is generally pneumatically effected against the force of a spring which tends to lift the permanent-magnet slipper brake. On the other hand, a rotatable permanent magnet must be rotated or turned through approximately 90° between two limbs or pole pieces, in order to direct the magnetic flux through the rails or rail tracks, whereby the permanent-magnet slipper brakes are attracted with full force toward the rails and the vehicle is fully braked. An example of such a rotatable magnet is shown in FIGS. 3 and 4 of British Pat. No. 721,748. For rotating or turning the permanent magnet between the pole pieces there are required the aforesaid relatively high forces which can be pneumatically applied only by cylinders and pistons of very large diameter.

However, it is difficult to provide such high forces by means of a pneumatic drive, without such pneumatic drive requiring a great deal of space.

SUMMARY OF THE INVENTION

Therefore, with the foregoing in mind, it is a primary object of the present invention to provide a new and improved construction of apparatus for engaging and disengaging a permanent-magnet slipper brake, which apparatus does not suffer from the aforementioned drawbacks and shortcomings of the prior art.

Another and more specific object of the present invention aims at providing a new and improved apparatus for engaging and disengaging a permanent-magnet slipper brake for a rail vehicle having no external electrical or external hydraulic connections, which apparatus can apply the required engaging and disengaging forces without occupying a great deal of space.

Now in order to implement these and still further objects of the present invention which will become more readily apparent as the description proceeds, the apparatus for engaging and disengaging a permanent-magnet slipper brake for a rail vehicle and constructed according to the invention is manifested, among other things, by the features that the permanent-magnet slipper brake is engageable and disengageable by a hydraulic motor which is driven by a pneumatically driven hydraulic power pump.

The process of engaging and disengaging the permanent-magnet slipper brake is advantageously controllable by means of the pneumatic main line of the rail vehicle.

A pneumatic motor is connected to the pneumatic feed line or conduit of the rail vehicle and serves to drive the hydraulic power pump.

A pneumatically actuatable lowering cylinder is provided for lowering the permanent-magnet slipper brake on to rails or rail tracks for the rail vehicle, whereby such lowering operation is effected against spring means having a predetermined force.

A check or stop valve arranged in a line or conduit provided between the hydraulic power pump and the hydraulic motor is actuatable by a pneumatically actuatable seat valve which, in turn, is actuatable by a control valve. This control valve is arranged in a line or conduit provided between the pneumatic feed line or conduit and the aforesaid seat valve and is controllable by the pressure in the pneumatic main line of the rail vehicle, in order to engage or switch on the permanent-magnet slipper brake.

Two microvalves connected to the aforesaid control valve are actuatable by the hydraulic motor. One of the two microvalves is arranged in a first line or conduit provided between the pneumatic feed line or conduit and the seat valve, while the other one of the two microvalves is arranged in a second line or conduit provided between the pneumatic feed line or conduit and the seat valve.

BRIEF DESCRIPTION OF THE DRAWING

The invention will be better understood and objects other than those set forth above will become apparent when consideration is given to the following detailed description thereof. Such description makes reference to the single annexed drawing in which there is schematically shown the complete structure of the apparatus for engaging and disengaging a permanent-magnet slipper brake and constructed according to the invention.

DETAILED DESCRIPTION OF THE PREFERRED EMBODIMENTS

Describing now the drawing, it is to be understood that to simplify the showing thereof, only enough of the construction of the apparatus for engaging or activating and disengaging or deactivating a permanent-magnet slipper brake for a rail vehicle has been illustrated therein as is needed to enable one skilled in the art to readily understand the underlying principles and concepts of this invention. In the drawing, pneumatic lines are depicted as solids lines, hydraulic lines are depicted as bold solid lines and relay type connections are depicted as dotted lines.

Turning attention now to the drawing, the apparatus for engaging and disengaging a permanent-magnet slipper brake illustrated therein by way of example and not limitation will be seen to comprise a main air or pneumatic line 110 and a pneumatic feed line or conduit 111. A pressure in the range of 8 bar to 10 bar prevails in the pneumatic feed line or conduit 111. When the permanent-magnet slipper brake is disengaged or switched off, a pressure of substantially 5 bar prevails in the main air line 110.

For the braking operation the pressure in the main air line 110 is lowered in customary manner, for example, to less than 3 bar. A control valve 1 is actuatable by the main air line 110.

When the permanent-magnet slipper brake is disengaged or switched off, the control valve 1 is closed, i.e. the pressure from the pneumatic feed line or conduit 111 is shut off and a line or conduit 112 downstream of the control valve 1 is pressureless.

A compressed-air container 2 is connected via a check valve 3 to the pneumatic feed line or conduit 111, this compressed-air container 2 being continuously or permanently filled or charged to the pressure of the pneumatic feed line or conduit 111.

Furthermore, a pressure intensifier 17 is connected to the pneumatic feed line or conduit 111 via the aforesaid check valve 3. The mode of operation of such pressure intensifier 17 is here assumed to be generally known. When the pressure drops in the main air line 110, the pressure generated by the pressure intensifier 17 increases. Furthermore, this pressure intensifier 17 can be subjected to compressed or pressurized air from the pneumatic feed line or conduit 111 via a hand valve 25 and a dual check valve 16. Moreover, this pressure intensifier 17 is connected to the pneumatic feed line or conduit 111 by means of the control valve 1, a valve 15 and the dual check valve 16.

The pressure intensifier 17 serves to lower permanent-magnet slipper brakes 21 and is connected via a line or conduit Z to lowering cylinders 20 of the permanent-magnet slipper brakes 21. The pressure intensifier 17 is thus permanently connected via a line or conduit 113 to the pneumatic feed line or conduit 111 and can be selectively connected via a line or conduit 114 to the pneumatic feed line or conduit 111 or vented. The pressure intensifier 17 supplies a pressure in the line or conduit Z only when it is charged with or subjected to pneumatic feed-line pressure via the line or conduit 113 as well as via the line or conduit 114. The valve 15 is kept open by the pneumatic feed-line pressure via a line or conduit 115.

A pneumatic motor 27 is connected to the pneumatic feed line or conduit 111 via a line or conduit X and via a valve 29. This pneumatic motor 27 drives a hydraulic power pump 10 which, accordingly, permanently provides a hydraulic pressure in a supply line or conduit 116.

A reversing valve 4 controllable by the pressure in the line or conduit 114 is located in the line or conduit X which leads to two microvalves 5. Furthermore, the line or conduit 114 directly leads to two further microvalves 18. The two microvalves 5 as well as the two microvalves 18 are each connected via respective dual check valves 19 to a common further dual check valve 22 which is connected via the line or conduit 115 to a seat valve 6. In this manner, the seat valve 6 can be controlled by the two microvalves 5 as well as by the two microvalves 18.

Finally, there is provided a directional control valve 23 which is controllable by the pressure in the line or conduit 114. By means of this directional control valve 23 it is possible to reverse the directions of rotation of two hydraulic motors 9 which are connected to the aforesaid hydraulic power pump 10 via the supply line or conduit 116. A return line or conduit 117 leads from the two hydraulic motors 9 to a hydraulic oil reservoir or tank 26. By means of this directional control valve 23 it is possible to interchange the connection of the supply line or conduit 116 and the return line or conduit 117 with connection lines or conduits 118 and 119 to the hydraulic motors 9.

The permanent magnets 31 of the two permanent-magnet slipper brakes 21 can be engaged and disengaged in customary manner with the aid of the hydraulic motors 9. The two microvalves 5 and the two microvalves 18 are depicted in the position which they assume when the two permanent-magnet slipper brakes 21 are engaged or placed on the rails 30. In the not particularly illustrated state of the permanent-magnet slipper brakes 21 in the released or disengaged position, the line or conduit 114 is maintained open by the two microvalves 18, while the line or conduit X is held closed by the two microvalves 5.

A check or stop valve 7 is placed in the supply line or conduit 116. This check or stop valve 7 can be actuated by the aforementioned seat valve 6 which is installed in the supply line or conduit 116 and in a line or conduit 120 which lead from the hydraulic power pump 10 to the check or stop valve 7. A hydraulic oil container 11 is filled by the hydraulic power pump 10 with pressurized or pressure oil via the supply line or conduit 116. A pressure limiting valve 12 prevents the hydraulic oil container 11 from being overcharged. A quick-stop accelerator 13 renders possible venting the main air line 110, whereby the braking process is accelerated. A brake pressure controller or control unit 24 renders possible opening and interrupting the line or conduit 115. When this line or conduit 115 is interrupted, the valve 15 is closed. This valve 15 is open when the line or conduit 115 is open.

Having now had the benefit of the detailed description of the construction of the apparatus for engaging and disengaging a permanent-magnet slipper brake constructed according to the invention, the mode of operation of the permanent-magnet slipper brake by means of the inventive apparatus will now be considered in conjunction with the drawing and is as follows:

When the permanent-magnet slipper brakes 21 are disengaged or switched off, the control valve 1 is in the closed position and the line or conduit 112 is pressureless or nonpressurized. The compressed air from the pneumatic feed line or conduit 111 arrives at the compressed-air container 2, the pressure intensifier 17 and the pneumatic motor 27 of the hydraulic power pump 10. This hydraulic power pump 10 operates until the desired pressure prevails in the hydraulic oil container 11 and is then automatically shut off. Since the line or conduit 112 is pressureless or nonpressurized, the line or conduit 114 is likewise pressureless and the reversing valve 4 is open, so that compressed air from the line or conduit X can be supplied up to the two microvalves 5. Since these microvalves 5 are closed when the permanent-magnet slipper brakes 21 are disengaged or released, the seat valve 6 is also closed and the check or stop valve 7 is closed. The pressure limiting valve 12 prevents the hydraulic oil container 11 from being overfilled and renders possible pressure relief in the event of inspection or repair work. The two permanent-magnet slipper brakes 21 are in their uppermost position and are disengaged or switched off by the two hydraulic motors 9.

Upon rapid deceleration, the pressure in the main air line 110 rapidly drops. The quick-stop accelerator 13 connects the main air line 110 with the outside air and therewith accelerates the venting of the latter. As soon as the main air line pressure falls below 3 bar, the control valve 1 is opened. A reversing valve 14 and the valve 15 being open, compressed or pressurized air from the pneumatic feed line or conduit 111 arrives at the pressure intensifier 17 via the line or conduit 112 and via the line or conduit 114. In this manner, compressed or pressurized air from the pressure intensifier 17 is fed via the line or conduit Z into the lowering cylinders 20 and the permanent-magnet slipper brakes 21 are lowered on to the rails or rail tracks 30 against the force of respective springs 28.

Simultaneously, compressed air from the pneumatic feed line or conduit 111 is supplied to the seat valve 6 via the two microvalves 18 and the dual check valve 22. The seat valve 6 is thereby opened with the result that pressurized or pressure oil from the hydraulic oil container 11 is supplied to the check or stop valve 7 via the seat valve 6 and the line or conduit 120. The check or stop valve 7 is opened and pressurized or pressure oil from the hydraulic oil container 11 is supplied to the directional control valve 23 via the supply line or conduit 116 and through the opened check or stop valve 7.

Upon opening the control valve 1, the directional control valve 23 is likewise subjected via the line or conduit 114 to pressure of the pneumatic feed line or conduit 111 and thereby actuated such that pressurized or pressure oil from the hydraulic oil container 11 flows to the two hydraulic motors 9 via the supply line or conduit 116, through the opened check or stop valve 7 and via the reversed or changed-over directional control valve 23.

The hydraulic motors 9 rotate or turn the permanent magnets 31 of the permanent-magnet slipper brakes 21, whereby these slipper brakes 21 are engaged or switched on. The magnetic flux is guided or directed through the rails or rail tracks 30 and the permanent-magnet slipper brakes 21 immediately become fully effective.

The microvalves 18 as well as the microvalves 5 are actuated by the rotary or turning motion of the permanent magnets 31 of the permanent-magnet slipper brakes 21. In other words, the microvalves 18 are closed, causing the seat valve 6 to be switched over and the check or stop valve 7 to be closed. In this manner, the connection from the hydraulic oil container 11 to the two hydraulic motors 9 is interrupted. Since the hydraulic motors 9 are internally not hermetically sealed, such hydraulic motors 9 become pressureless, particularly when these hydraulic motors 9 are rotary motors equipped with rotary motor vanes. However, the permanent magnets 31 remain switched on, because they are retained in their position by the magnetic flux.

The actuation of the two microvalves 5 remains ineffective because, in the case of rapid deceleration effected by the feed pressure in the line or conduit 114, the reversing valve 4 is closed. The two microvalves 5 are thus opened by the permanent-magnet slipper brakes 21, without compressed air being supplied to the seat valve 6. Therefore, such seat valve 6 continues keeping the check or stop valve 7 closed. The pressure in the hydraulic oil container 11 drops as a result of this braking operation, so that the hydraulic power pump 10 is switched on and remains in operation until the pressure in the hydraulic oil container 11 is raised to again assume the predetermined or desired value.

The disengagement or release of the permanent-magnet slipper brakes 21 is effected when the pressure in the main air line 110 increases. As soon as such pressure in the main air line 110 rises above 3.5 bar, the control valve 1 closes. The line or conduit 114 leading to the reversing valve 14 and to the dual check valve 16 is thus vented, whereby the pressure intensifier 17 is also switched over. The line or conduit Z also becomes pressureless and the lowering cylinders 20 are vented, so that the permanent-magnet slipper brakes 21 can be lifted from the rails or rail tracks 30 by the force of the springs 28 as soon as the magnetic force fades away.

Simultaneously, the branches of the line or conduit 114 leading to the directional control valve 23 and to the reversing valve 4 are also vented. The directional control valve 23 is switched over and the reversing valve 4 is opened. In this manner, compressed air from the pneumatic feed line or conduit 111 is supplied to the seat valve 6 via the line or conduit X and the reversing valve 4 as well as via the two open microvalves 5 and the common dual check valve 22, the seat valve 6 being thereby opened.

Accordingly, the check or stop valve 7 opens and pressurized or pressure oil from the hydraulic oil container 11 arrives via the switched-over directional control valve 23 at the two hydraulic motors 9, whereby the permanent-magnet slipper brakes 21 are disengaged or released. The permanent magnets 31 of the slipper brakes 21 are switched off. The microvalves 5 and 18 are again actuated by the rotary or turning motion of the permanent magnets 31 of the slipper brakes 21, i.e. the microvalves 18 are opened and the microvalves 5 are closed. The seat valve 6 is shut off, whereby the check or stop valve 7 is also closed and the supply or feed of pressurized or pressure oil to the hydraulic motors 9 is interrupted.

The brake controller or control unit 24 renders possible a speed-dependent control of the permanent-magnet slipper brakes 21. At a traveling speed below 50 km/hr, the brake controller or control unit 24 is closed and, accordingly, also the valve 15. Actuation of the permanent-magnet slipper brakes 21 by the main air line 110 is thus not possible. As soon as the traveling speed rises above 50 km/hr, the brake controller or control unit 24 is then opened, whereby the braking operation can be effected in the hereinbefore described manner by lowering the pressure in the main air line 110.

The hand valve 25 renders possible manually actuating or operating the permanent-magnet slipper brakes 21.

The hereinabove described permanent-magnet slipper brakes 21 can be readily combined with friction brakes acting on the vehicle wheels, such friction brakes being of any construction or system such as, for example, a customary compressed-air brake controlled by the main air line pressure. In the case of a hydraulic friction brake, the pressurized or pressure oil stored in the hydraulic oil container 11 can also be used for the hydraulic feed of such hydraulic friction brake.

While there are shown and described present preferred embodiments of the invention, it is to be distinctly understood that the invention is not limited thereto, but may be otherwise variously embodied and practiced within the scope of the following claims.

Accordingly, what we claim is:

1. An apparatus for engaging and disengaging a permanent-magnet slipper brake for a rail vehicle equipped with a pneumatic main air line and a pneumatic feed line, comprising:

a hydraulic motor;

said permanent-magnet slipper brake being engageable and disengageable by rotation of said hydraulic motor;

a pneumatically driven hydraulic power pump;
said pneumatically driven hydraulic power pump driving said hydraulic motor;
a pneumatic motor connected to said pneumatic feed line;
said pneumatic motor driving said hydraulic power pump;
said permanent-magnet slipper brake being controllable in response to air pressure in said pneumatic main air line;
said apparatus being supplied with compressed air by said pneumatic feed line;
a hydraulic line provided between said hydraulic power pump and said hydraulic motor;
a check valve arranged in said hydraulic line and provided between said hydraulic power pump and said hydraulic motor;
a pneumatically actuatable seat valve actuating said check valve;
a pneumatic line provided between said pneumatic feed line and said seat valve;
a control valve arranged in said pneumatic line and provided between said pneumatic feed line and said seat valve;
said control valve actuating said seat valve; and
said control valve being actuated in response to predetermined air pressure in said main air line in order to engage said permanent-magnet slipper brake.

2. The apparatus as defined in claim 1, further including a pneumatically actuatable lowering cylinder for lowering said permanent-magnet slipper brake to rails provided for the rail vehicle.

3. The apparatus as defined in claim 2, further including:
spring means having a predetermined force for biasing said permanent magnet slipper brake to an upper position; and
said pneumatically actuatable lowering cylinder lowering said permanent-magnet slipper brake against said predetermined force of said spring means.

4. The apparatus as defined in claim 1, further including:
two pairs of microvalves actuatable by said hydraulic motor and operatively connected to said control valve;
a first pneumatic line provided between said pneumatic feed line and said seat valve;
one pair of said two pairs of microvalves being arranged in said first pneumatic line;
a second pneumatic line provided between said pneumatic feed line and said seat valve; and
the other one pair of said two pairs of said two microvalves being arranged in said second pneumatic line.

* * * * *